Figure 1:
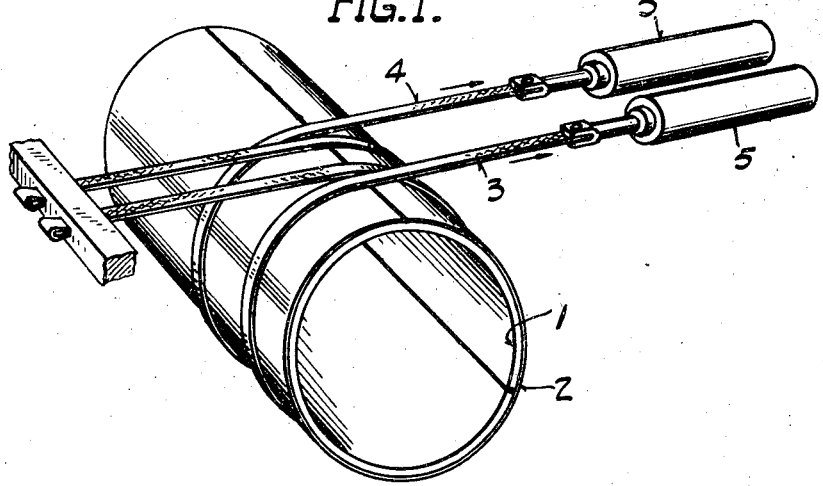

Aug. 30, 1949.  T. McL. JASPER  2,480,369
MANUFACTURE OF MULTILAYER CYLINDER
FOR HIGH PRESSURE VESSELS
Filed Nov. 7, 1941

Thomas McLean Jasper
INVENTOR.

BY *Elwin A. Andrus*
ATTORNEY.

Patented Aug. 30, 1949

2,480,369

UNITED STATES PATENT OFFICE 2,480,369

MANUFACTURE OF MULTILAYER CYLINDER FOR HIGH-PRESSURE VESSELS

Thomas McLean Jasper, Milwaukee, Wis., assignor to A. O. Smith Corporation, Milwaukee, Wis., a corporation of New York Application November 7, 1941, Serial No. 418,205

5 Claims. (Cl. 29—148.2)

This invention relates to the manufacture of multi-layer cylinders for high pressure vessels and has particular relation to the fabrication of the cylindrical wall of pressure vessels.

In the art of high pressure cylinders it has been known that where the ratio between the inside diameter and wall thickness was as low as ten the simple formula, $$S = \frac{PD}{2T}$$

for figuring stress did not apply. Furthermore, it was known that in applying internal pressure to load such a cylinder the metal of the outer portion of the cylinder was stressed considerably lower than that of the inner portion.

This latter fact resulted in low efficiency per unit weight for cylinders having extremely thick walls and relatively small diameter, and attempts have been made to overcome this loss in efficiency. Multi-layer cylinders have offered the most favorable construction for overcoming the difficulty since they are more flexible under load and less rigid than thick plate cylinders.

In the United States patent to R. Stresau, No. 1,925,118 pressure vessels employing multi-layer cylinders are described, and in these the layers are of relatively thin sheets of metal welded in position. In the practice of making cylinders under the Stresau patent the layers have been wrapped tightly upon one another prior to welding in order to insure the advantages of the multi-layer construction without too great a loss in the transmission of working stress to the outer layers. In this practice the tightness of the wrapping and the shrinkage of the welds have in some instances resulted in a small amount of initial compressive stress being set up in the inner layer or layers and a tensile stress being set up in the outer layer or layers. Such a compressive stress insofar as known has always been very low, and would not be obtained in every cylinder since the manufacturing tolerances would prevent it.

The application of W. Kepler, Serial Number 204,937, filed April 29, 1938, which issued on December 21, 1943 as Patent Number 2,337,247, describes a method of treating such vessels whereby the inner layers may be placed under added compressive stress and the outer layers under tensile stress so that a greater efficiency is obtained under the working load. The method described, effects however, an expansion of the inner layers into the outer layers by internal fluid pressure, and depends upon the relative elastic return of the several layers to obtain the pre-stressing of the vessel.

It has also been proposed to make cylinders from a few layers of metal accurately machined on their meeting surfaces and contracted upon one another by thermal treatment to effect a compressing of the inner layer. This process, however, is entirely too expensive for use in the making of pressure vessels.

The object of the present invention is to provide a simple and very inexpensive method for substantially increasing the efficiency of multi-layer cylinders under working load.

Another object is to provide such a method which is applied during the regular fabrication of the cylinder without requiring additional separate steps.

In accordance with the invention each layer of metal, as it is applied to the cylinder, is tightened thereon not only an amount sufficient to substantially remove voids which may be present between it and the previous layer, but additionally to an amount which will set up initial compressive stresses in the metal of the inner layers and initial tensile stresses in the metal of the outer layers which substantially offset the difference in rate of stressing of the several layers as computed under the Lamé formula:

$$S = \frac{PR_1^2(R_2^2 + R^2)}{R^2(R_2^2 - R_1^2)}$$

in which:

S denotes the circumferential tensile stress in pounds per square inch at any given point in the section;

P denotes the internal fluid pressure in pounds per square inch on the inside of the cylinder;

R denotes the radius in inches at the point of stress;

$R_1$ denotes the inside radius of the section in inches; and $R_2$ denotes the outside radius of the section in inches.

The invention constitutes a substantial improvement upon the process described in the Stresau patent above referred to and employed in the manufacture of multi-layer vessels under that patent, in that the mechanical tightening of the layers is carried to an extent not only sufficient to minimize voids between the relatively thin layers of metal under manufacturing tolerances, but to apply a pre-stressing of the metal resulting in a more efficient distribution of stress in service.

The invention constitutes an improved alternative method to that set forth in the Kepler application above referred to, in that the present invention utilizes the mechanical wrapping step to obtain the principal pre-stressing of the layers.

Figure 2:
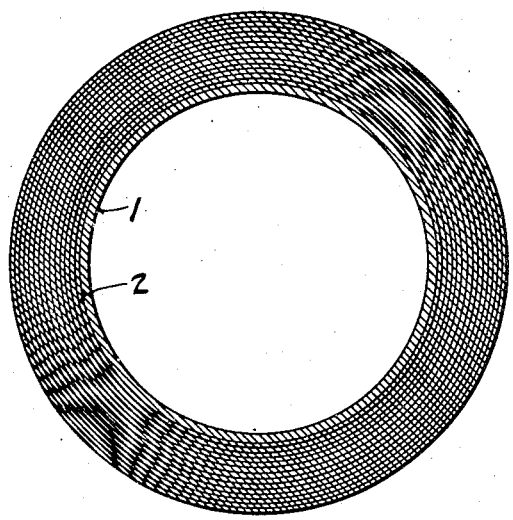

The accompanying drawing illustrates diagrammatically the principle in the process and the views therein are as follows:

Figure 1 is a diagrammatic perspective view showing the applying of the second layer on the innermost layer of the vessel and the use of tightening bands; and Fig. 2 is a transverse section through a completed cylinder of substantial thickness.

In carrying out the present invention, the innermost layer 1 is formed from a metal plate or sheet rolled or pressed into cylindrical shape and welded along the longitudinal seam to provide a closed cylinder and the next layer 2 of metal is applied over the inner cylinder by wrapping it thereon and then tensioning bands 3 and 4 are applied around the structure with a very considerable tensioning force, preferably hydraulic, to actually compress the previous layer or layers.

Applicant employs large hydraulic cylinders 5 with a pair of narrow bands 3 and 4 spaced a very short distance apart to draw a circumferential area of the layers together. A force of as high as thirty-five tons has been applied to tighten each band upon the structure. The open seam of the layer being applied is then welded at its position between the bands and the latter are moved longitudinally on the cylinder to another location for tightening, pre-stressing and welding. The welds are usually substantially long and spaced about fifteen inches apart on centers along the longitudinal seam of the layer and after all of the preliminary welds are finished the bands are removed and the welding of the seam is completed preferably by a continuous arc welding process. The shrinkage of the preliminary welds and of the final welds upon cooling adds to the tightening and stressing of the layers. The outer surface of the welds should be machined or ground flush with the surface of the layer prior to the application of the next layer in each instance.

Each subsequent layer is preferably applied, tightened with the structure compressed, welded, and released in the same manner. While it might be possible within the scope of the invention to apply more than one layer at one time, or to apply the pre-stressing step only to certain layers, it is preferable to apply each layer separately and to pre-stress the structure each time a layer is applied.

The amount of tension required in the bands will depend upon the amount of pre-stressing desired and the relative diameter and thickness of the previously formed portion of the cylinder and the thickness of the layer being applied. In general, the stresses resulting directly from the application of the tensioning bands will not exceed the elastic limit of the steel. Also, the thinner the layer being applied, the greater the ease of eliminating voids between layers. For ordinary steel, one quarter inch is a satisfactory thickness of layer.

The pre-stressing of the metal obtained by the method just described should approach that which would theoretically equalize the working load over all of the layers. For instance, according to the Lamé formula, an ordinary cylinder not made under the present invention and which has an outer radius-inner radius ratio of 2 is only 60% as efficient as it should be. This lack of efficiency in a non-pre-stressed cylinder is due to the fact that the inner portion of the cylinder wall takes most of the stress under load and fails to transmit a proper or proportional share of the load to the outer portion of the wall. This difficulty exists with solid wall cylinders as well as with those made up of a plurality of layers and results in the designing of unnecessarily heavy structures for high pressures and large factors of safety.

The present invention overcomes this difficulty depending upon the amount of pre-stressing given to the cylinder during fabrication. It is possible by computations, and by the use of strain guage measurements during fabrication, to determine the amount of pre-stressing being obtained in the cylinder. The total amount of pre-stressing obtained will depend upon a relation between the tensioning force applied by the bands and the thinness of the layers, the number of layers, the diameter and the wall thickness.

By pre-stressing, as herein referred to, is meant the building up of an initial residual compressive stress in the inner layers of metal balanced by an initial residual tensile stress in the outer layers. This pre-stressing results from a squeezing of the inner layers and the securing of an added layer upon them under conditions in which such added layer prevents a full elastic return of the inner layers when the tensioning bands are removed. The added layer is tensioned by reason of the tendency of the inner layers to expand into it. The applying of each successive layer to the structure effects additional pre-stressing of the previous layers and tends to move the neutral axis of the pre-stress radially outward in the structure.

Where each layer after the first is applied as above described with the same amount of tensioning, it has been discovered that the compressive stress has a tendency to accumulate in the innermost layer to values out of proportion to those in other layers upon completion of the vessel, and that the major portion of the compressive stress is developed in only a few inner layers, the neutral axis of the structure being located nearer the inner wall than desirable. In cylinders having low outer radius-inner radius ratios this peak concentration of the compressive stress may be objectionable, in which case it may be alleviated by a predetermined varying of the tensioning of the bands so that during the applying of the first few layers less tensioning and consequently a lower stress differential between the first few layers will be obtained. This adjustment of the tensioning to start with light tensioning on early layers and to finish with the heaviest tensioning on the final layers, will depend upon a number of factors including the number of layers in the structure. In structures approximating or in excess of a diameter thickness ratio of ten, it is generally satisfactory and less costly to employ an equal tensioning force on the bands for all of the layers.

Under the Lamé formula there is a substantial peak or concentration of the working stress in the innermost layers, and to this extent the peak in the compressive stress developed by the present invention is of advantage to offset the former. The tensile stress developed by the present invention, in the outer layers is added to that resulting from the working load so that under working conditions the stress in all of the layers will approach equality, the ideal condition.

Vessels constructed with pre-stressing which equalizes the load on the several layers to provide ideal working conditions, as is possible under the present invention, do not have the weaknesses resulting from different rates of stress increase for inner and outer layers. The strength of such vessels can be figured on the basis of the following formula:

$$S = \frac{PDi}{2T}$$

where:

S denotes the circumferential tensile stress in pounds per square inch at ultimate failure;

P denotes the internal fluid pressure in pounds per square inch at ultimate failure;

Di denotes the inside diameter in inches; and

T denotes the wall thickness in inches.

A cylinder made in accordance with the present invention has increased efficiency and will withstand a considerably higher working load at a given factor of safety. By reason of the increased efficiency, it is possible to save as much as 40% of the weight of the cylinder in some cases, which saving is not only directly reflected in a saving of material, but also in a saving of fabrication costs by reason of the elimination of a large number of layers.

Cylinders of the character described will usually have their ends closed by suitable heads welded to the ends of the layers.

Various practices may be employed within the scope of the invention.

The invention is claimed as follows:

1. In the manufacture of multi-layer high pressure cylinders, the steps of providing a closed cylindrical member constituting the inner structure, wrapping a relatively thin layer of sheet metal thereon with the adjacent side edges of the layer constituting a longitudinal seam to be welded and pressing said latter layer tightly against said inner cylindrical structure by encircling the same with a tension band of relatively low frictional contact with the layer and tightening the band circumferentially to apply forces elastically squeezing said inner structure to a smaller diameter, welding the longitudinal seam in said layer, releasing the squeezing pressure on the structure to effect an elastic return of the inner structure into said layer to thereby provide initial compressive stress in the metal of the inner structure and initial tensile stress in the metal of the outer layer, and employing similar squeezing, welding and releasing operations for the application of subsequent layers upon the structure, the neutral axis of pre-stress in the layers moving radially outward during the fabrication of a thick wall so that the first layer above referred to and others adjacent thereto have their initial stress changed from tensile to compressive stress to provide a balanced structure which is pre-stressed in a direction tending to overcome the different rates of stress increase under working loads of the inner and outer layers.

2. In the manufacture of multi-layer high pressure cylinders, the steps of providing a closed cylindrical member constituting the inner structure, wrapping a relatively thin layer of sheet metal thereon and pressing said latter layer tightly against said inner cylindrical structure with forces elastically squeezing said inner structure to a smaller diameter, welding the longitudinal seam in said layer, releasing the squeezing pressure on the structure to effect an elastic return of the inner structure into said layer to thereby provide initial compressive stress in the metal of the inner structure and initial tensile stress in the metal of the outer layer, and employing similar squeezing, welding and releasing operations for the application of subsequent layers upon the structure, the neutral axis of pre-stress in the layers moving radially outward during the fabrication of a thick wall so that the first layer above referred to and others adjacent thereto have their initial stress changed from tensile to compressive stress to provide a balanced structure which is pre-stressed in a direction tending to overcome the different rates of stress increase under working loads of the inner and outer layers, and the squeezing forces employed in the application of the outer layers being greater than those employed in the application of the first layer above referred to and others adjacent thereto to more nearly equalize the differences in pre-stress between the several layers and minimize the concentration of compressive stress in the inner structure and the next adjacent layers.

3. In the manufacture of pre-stressed multi-layer high pressure cylinders, the method of pre-stressing the structure during fabrication comprising encircling an unwelded layer of metal having an open longitudinal seam and superimposed upon the partially completed cylinder wall with a tensioning band of relatively low frictional contact therewith, tightening the band circumferentially to press the layer upon the structure and squeeze the latter uniformly to a smaller diameter in the region of said band, then initially welding the longitudinal seam in the layer adjacent the tension band, thereafter releasing the tension band and moving the same to a successive longitudinal region of the cylinder, similarly tightening the band upon the cylinder and welding the seam adjacent thereto, thereafter releasing the band, and continuing said tightening, welding and releasing operations in successive longitudinal regions of the cylinder until the inner structure is confined in a pre-stressed condition by said layer throughout substantially the entire length of the latter.

4. In the manufacture of pre-stressed multi-layer high pressure cylinders, the method of pre-stressing the structure during fabrication comprising encircling an unwelded layer of metal having an open longitudinal seam and superimposed upon the partially completed cylinder wall with a tensioning band of relatively low frictional contact therewith, tightening the band circumferentially to press the layer upon the structure and squeeze the latter uniformly to a smaller diameter in the region of said band, then initially welding the longitudinal seam in the layer adjacent the tension band, thereafter releasing the tension band and moving the same to a successive longitudinal region of the cylinder, similarly tightening the band upon the cylinder and welding the seam adjacent thereto, thereafter releasing the band, and continuing said tightening, welding and releasing operations in successive longitudinal regions of the cylinder until the inner structure is confined in a pre-stressed condition by said layer throughout substantially the entire length of the latter, and thereafter removing the band and completing the welding of the longitudinal seam of said layer.

5. In the manufacture of pre-stressed multi-layer high pressure cylinders, the method of pre-stressing the structure during fabrication comprising encircling an unwelded layer of metal having an open longitudinal seam and superimposed upon the partially completed cylinder wall with a tensioning band of relatively low frictional contact therewith, tightening the band circumferentially to press the layer upon the structure and squeeze the latter uniformly to a smaller diameter in the region of said band, then initially welding the longitudinal seam in the layer adjacent the tension band, thereafter releasing the tension band and moving the same to a successive longitudinal region of the cylinder, similarly tightening the band upon the cylinder and welding the seam adjacent thereto, thereafter releasing the band, continuing said tightening, welding and releasing operations in successive longitudinal regions of the cylinder until the inner structure is confined in a pre-stressed condition by said layer throughout substantially the entire length of the latter, thereafter removing the band and completing the welding of the longitudinal seam of said layer, and similarly applying successive layers of metal to the structure to provide residual compressive stresses in the metal of the inner portion of the structure and corresponding tensile stresses in the metal of the outer portion thereof.

THOMAS McLEAN JASPER.

REFERENCES CITED

The following references are of record in the file of this patent:

UNITED STATES PATENTS

| Number | Name | Date |
|---|---|---|
| 1,316,385 | Murray et al. | Sept. 16, 1919 |
| 1,363,158 | Murray et al. | Dec. 21, 1920 |
| 1,441,459 | Small | Jan. 9, 1923 |
| 1,651,521 | Girardville | Dec. 6, 1927 |
| 1,770,763 | Wolfstyn | July 15, 1930 |
| 1,804,888 | Monsch | May 12, 1931 |
| 1,920,791 | Hogan | Aug. 1, 1933 |
| 1,925,118 | Stresau | Sept. 5, 1933 |
| 1,969,540 | Bergstrom et al. | Aug. 7, 1934 |
| 1,982,852 | Bergstrom et al. | Dec. 4, 1934 |
| 2,217,090 | Obert | Mar. 2, 1937 |
| 2,209,402 | Kepler | July 30, 1940 |
| 2,217,090 | Zerbe | Oct. 8, 1940 |
| 2,218,085 | Watson | Oct. 22, 1940 |
| 2,273,736 | Raymond et al. | Feb. 17, 1942 |

FOREIGN PATENTS

| Number | Country | Date |
|---|---|---|
| 342,945 | Great Britain | Feb. 12, 1931 |